UNITED STATES PATENT OFFICE.

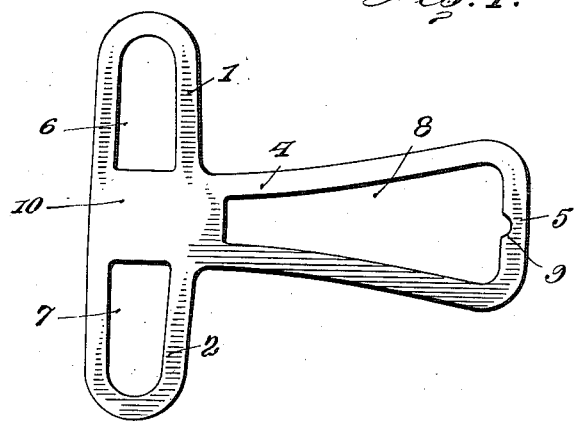
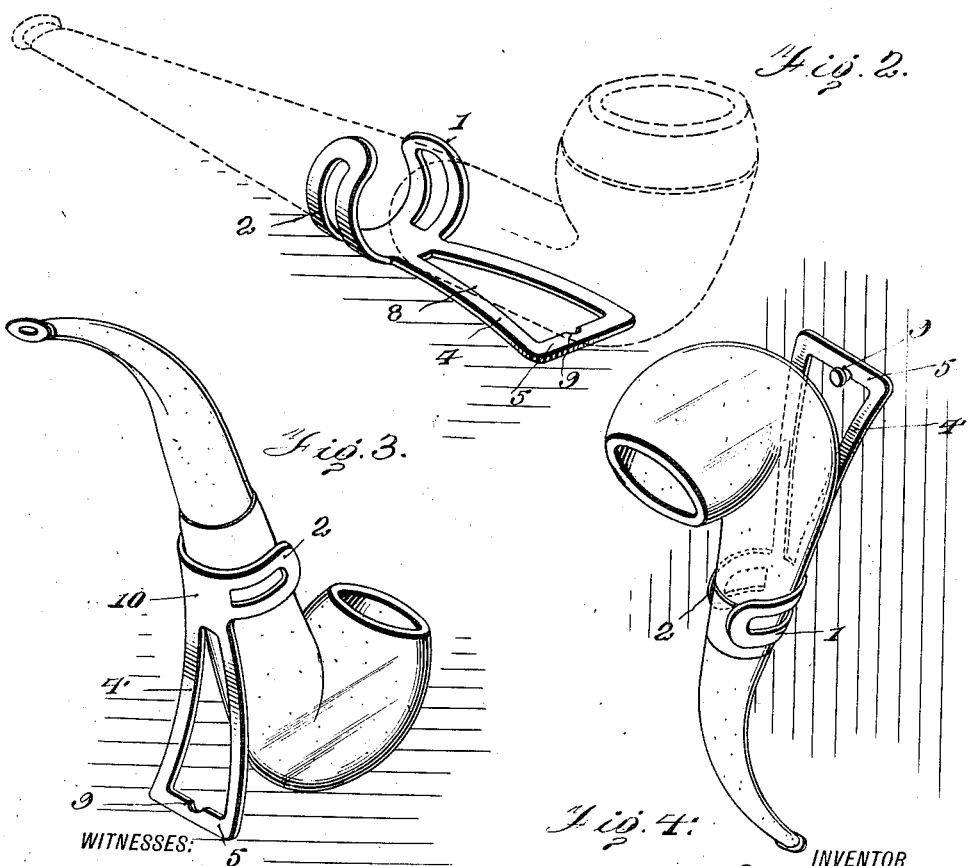
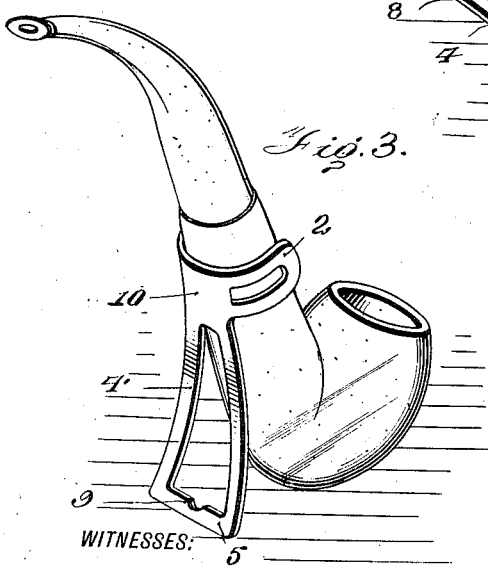

HOWARD ELLIOTT, OF WASHINGTON, DISTRICT OF COLUMBIA.

ATTACHMENT FOR SMOKERS' PIPES.

994,913.　　　　Specification of Letters Patent.　Patented June 13, 1911.

Application filed March 4, 1911.　Serial No. 612,336.

*To all whom it may concern:*

Be it known that I, HOWARD ELLIOTT, a citizen of the United States, and a resident of the city of Washington, in the District of Columbia, have invented certain new and useful Improvements in Attachments for Smokers' Pipes, of which the following is a specification.

This invention relates broadly to tobacco users' accessories, and more specifically to smokers' pipe supports.

The principal object of my invention is to provide an inexpensive and convenient article to be attached to a tobacco pipe to serve as a support therefor of a nature such as to prevent the pipe from falling over and spilling out its contents when laid down.

Another object of my invention is to provide a support for smokers' pipes of such nature that it may serve as a means for hanging up the pipe.

Another object of my invention is to provide a support for smokers' pipes of such nature that it can be adapted to any of the ordinary forms of smokers' pipes.

A further object of my invention is to provide a support for smokers' pipes of such nature that it will not interfere with the use of the pipe in any way.

A still further object of my invention is to provide an article of the class described which is adapted for use as an article for advertisement.

Other and further objects of my invention will in part be obvious and in part pointed out in the specific description which follows hereinafter.

The invention will be more specifically described by reference to the accompanying drawings which form a part of this application, and the scope of the invention will be indicated by the appended claims.

Like characters represent like parts throughout the several figures of the drawings.

Figure 1 is a plan of a blank before it is bent into form. Fig. 2 is a perspective view of my invention showing it as attached to a straight stem pipe and used as a support to hold the bowl upright when the pipe is laid down. Fig. 3 is a perspective view of my invention attached to a curved or drop stem pipe and in use to hold the bowl upright when the pipe is laid down. Fig. 4 is a perspective view of my invention showing it attached to a pipe and in use as a means for hanging up the pipe.

In the use of smokers' pipes it is very frequently desirable to lay the pipe down upon a table or other flat article, and the usual pipe is so constructed as to roll over on its side thus emptying a part of the contents upon the table top or other support upon which the pipe may be placed. Heretofore this has been sought to be prevented by forming the pipe with a flat base or integral prongs made upon the bowl of the pipe itself. Both of these means for preventing a pipe from upsetting are undesirable, for the reason that it either destroys the lines of the pipe or makes a pipe of such form as not to fit into an ordinary pipe case when it is desirable to carry the pipe in the pocket.

My invention which will hereinafter be more fully described, comprises a small detachable support which is adapted to be slipped over the stem of the pipe when in use and to be with equal facility removed from the pipe when it is desirable to carry the pipe in a case.

My invention more particularly is adapted to coöperate with any ordinary form of tobacco pipe. It does not change or destroy the shape of the pipe itself in any way whatsoever.

Referring more particularly to the specific form of my invention which is illustrated in the drawings, it comprises a support, preferably formed from a blank which is stamped from sheet metal in the form illustrated in Fig. 1, in which resilient wing members 1 and 2 are formed upon one end of a body portion 4. The outer end or foot of said body portion is preferably made with a portion 5 having a straight edge which is at right angles to the longitudinal axis of the body portion.

The device may be stamped from sheet steel or resilient hard drawn brass, and the wings 1 and 2 are bent into a proper shape to conform to the stem of a pipe, as is illustrated in Fig. 2, which shows the device coöperating with a straight stem pipe to support the pipe with its stem in a longitudinal direction and the bowl in a substantially vertical direction when the pipe is laid upon a flat surface. The wing members 1 and 2, may be cut out as at 6 and 7, in order to give more pliability and elasticity to the retaining wing members 1 and 2. The body portion 4 may also be formed with a cut out portion 8 and with a small depression 9 formed in the central portion of the foot 5. The small depression 9 is adapted to more particularly center the pipe when it is desirable to use the support as a hanger, after the manner illustrated in Fig. 4. A solid portion 10, between the wing members 1 and 2, forms a cross brace member, which gives greater stability to the device and also prevents the ridge portion of a square stem pipe from coming in contact with the table top or other flat surface upon which the pipe may be laid, thus obviating any tendency of the pipe to roll due to projections from the pipe passing through openings in the support. The body portion 4 of the device however, may with equal facility be formed solid in order to leave a flat surface upon which advertising matter may be printed or stamped.

As many obvious changes could be made in the above described invention and many widely different embodiments of this invention might be made without departing from the scope thereof, I desire it to be understood that the matter contained in the above described structure and shown in the accompanying drawings, is to be taken as illustrative and not in a limiting sense.

Having thus described my invention what I desire to claim is:—

1. A rest for smokers' pipes comprising a body portion, resilient wing members integral with said body portion, said wing members being oppositely disposed to each other at the extremity of said body portion and bent to engage the stem of a pipe, the base of said body portion being formed to provide a support, and the major axis of said body portion lying approximately parallel to the major axis of the stem of the pipe when said attachment is in operative position.

2. A rest for smokers' pipes comprising a body portion, resilient members upon said body portion and formed to engage the stem of a pipe, the base of said body portion being constructed to comprise a support, said body portion being recessed and medially notched to form a hanger for said pipe, and said body portion having its major axis approximately parallel to the major axis of the stem of the pipe when the device is in operative position.

3. In combination with a smoker's pipe, a support comprising an elongated body portion having its axis substantially parallel to the axis of the stem of the pipe, means for attaching one end of the body portion to said pipe, and a base formed upon the other end of said body portion at substantially right angles to the axis of said body portion.

HOWARD ELLIOTT.

Witnesses:
  M. B. NICHOLS,
  C. S. BECKER.